US008634815B2

(12) United States Patent
Chu (10) Patent No.: US 8,634,815 B2
(45) Date of Patent: Jan. 21, 2014

(54) SYSTEM AND METHOD FOR REFLECTING INFORMATION FROM PARTICIPANTS

(75) Inventor: Andrew Chu, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1119 days.

(21) Appl. No.: 12/125,728

(22) Filed: May 22, 2008

(65) Prior Publication Data

US 2009/0293109 A1 Nov. 26, 2009

(51) Int. Cl.
*H04M 3/42* (2006.01)

(52) U.S. Cl.
USPC .......................... 455/416; 455/417; 455/418

(58) Field of Classification Search
USPC ........... 455/416; 370/328; 726/4, 26; 705/35, 705/319; 709/999.07
See application file for complete search history.

(56) References Cited

U.S. PATENT DOCUMENTS

| 7,640,006 | B2 * | 12/2009 | Portman et al. | ............ 455/412.1 |
| 2007/0030824 | A1 * | 2/2007 | Ribaudo et al. | ............... 370/328 |
| 2008/0005244 | A1 * | 1/2008 | Vernon et al. | ................. 709/204 |
| 2008/0153518 | A1 * | 6/2008 | Herberger et al. | ........... 455/466 |
| 2008/0243853 | A1 * | 10/2008 | Reding et al. | ..................... 707/9 |
| 2008/0313039 | A1 * | 12/2008 | Altberg et al. | .................. 705/14 |

* cited by examiner

*Primary Examiner* — Ajit Patel
*Assistant Examiner* — Julio Perez (57) ABSTRACT

An approach is provided for a method including initiating an information distribution session based on instructions from a first participant of a plurality of participants. The method also includes assigning access information and a passcode to the information distribution session, receiving posting information sent from two or more active participants of the plurality of participants using the access information with the passcode, and transmitting to the active participants the posting information of other active participants.

16 Claims, 9 Drawing Sheets

SYSTEM AND METHOD FOR REFLECTING INFORMATION FROM PARTICIPANTS

BACKGROUND OF THE INVENTION

Numerous scenarios can arise in which various individuals may want to exchange information, such as contact information, with mobile communication devices without an established hierarchy. As an example, at the beginning of a sales meeting, various participants of the meeting from different companies or different departments may want to exchange contact information of a business, or even a personal, nature. However, current practices of exchanging such information are laborious, inefficient, and prone to errors.

Therefore, there is a need for an approach that allows for the efficient distribution of information amongst participants of such an exchange.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for sharing information amongst various participants are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a cellular network and short messaging service (SMS), it is contemplated that other wireless networks and messaging technologies can be utilized.

Figure 1A:
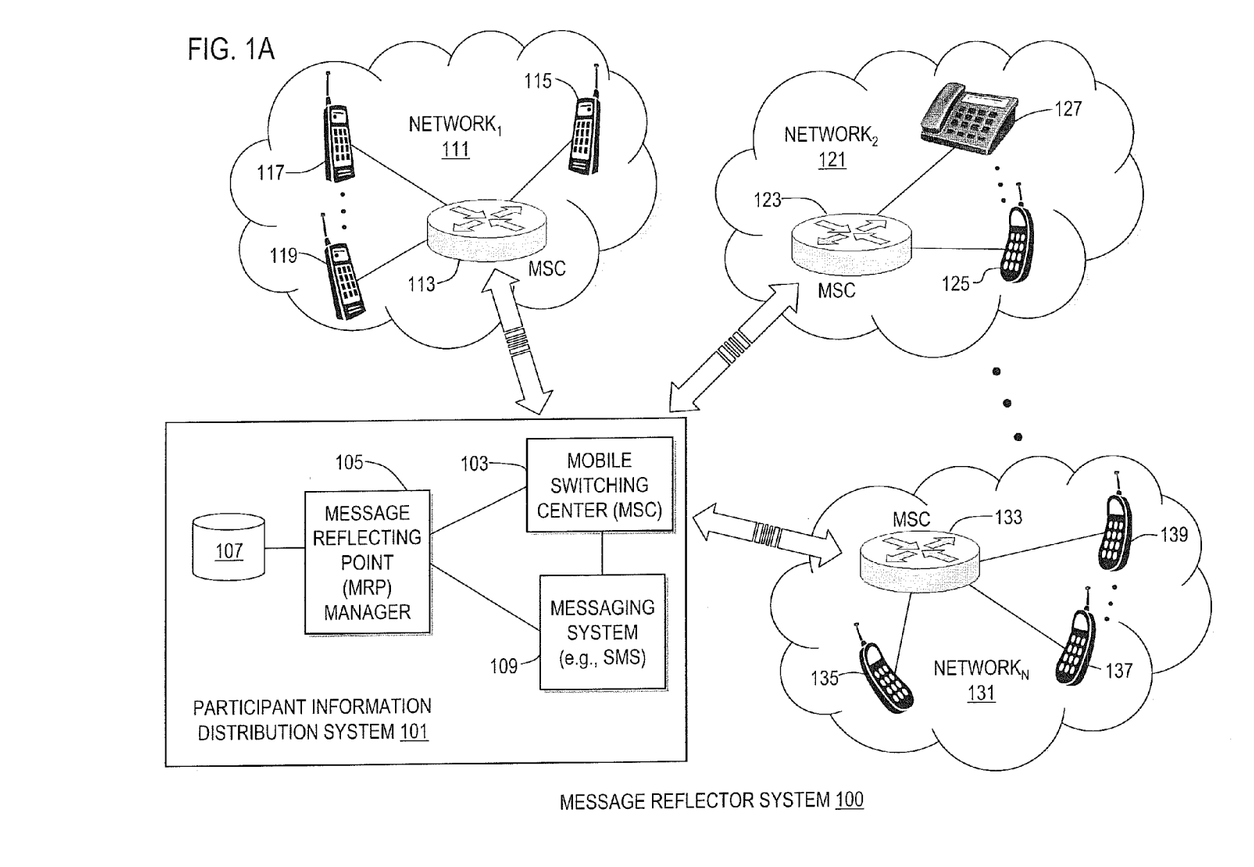
FIGS. 1A and 1B are, respectively, a diagram of a message reflector system (MRS) including an information distribution system capable of permitting sharing of participant information, and a flowchart of the associated process for sharing the participant information, according to various exemplary embodiments.
Figure 1B:
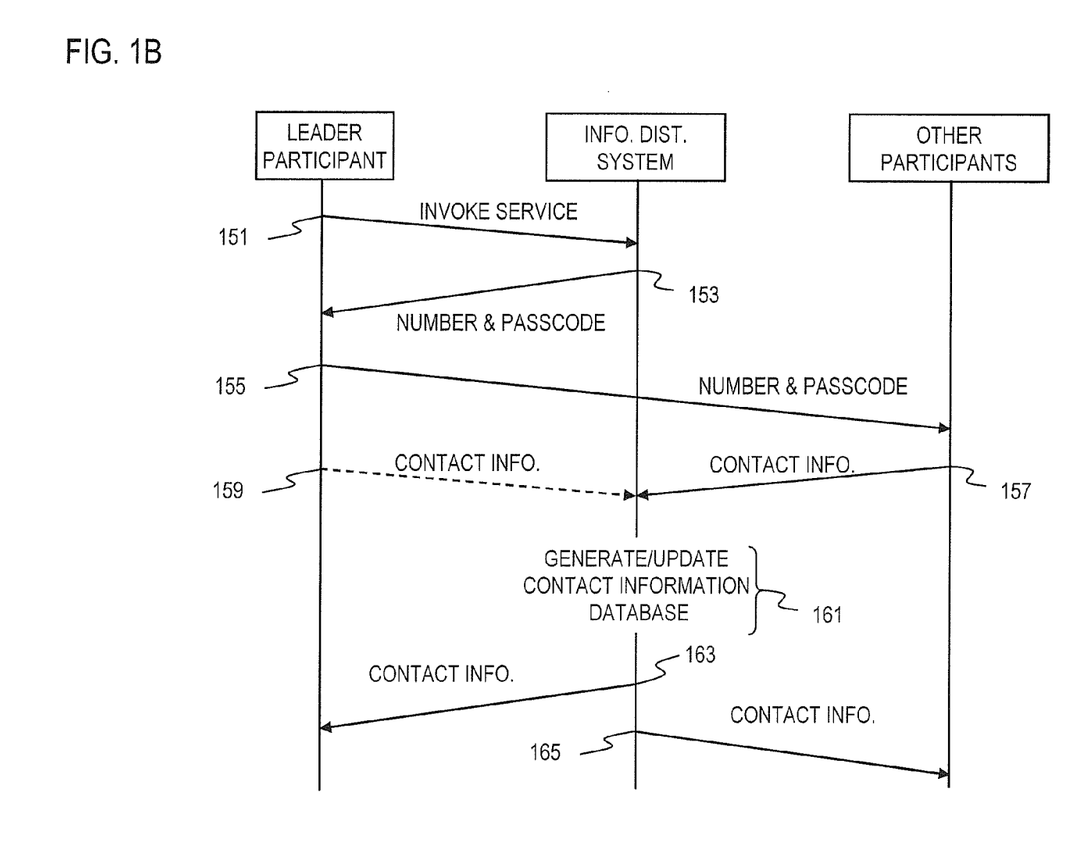

FIGS. 1A and 1B are, respectively, a diagram of a message reflector system (MRS) including an information distribution system capable of permitting sharing of participant information, and a flowchart of the associated process for sharing the participant information, according to various exemplary embodiments. In the embodiment depicted in FIG. 1A, an information distribution service is provided by a message reflector system (MRS) 100, which utilizes a participant information distribution system 101 to share participant information. That is, the participant information distribution system 101 can receive information from various participants, and distribute to the participants the information from the other participants.

FIG. 1A is a schematic diagram of an information distribution system 101 that is provided as a service to users of one or more networks (e.g., plural carrier networks, such as network$_1$ 111, network$_2$ 121, ... network$_N$ 131) and that can communicate with users of the one or more carrier networks, according to an exemplary embodiment of the present invention. In the embodiment depicted in FIG. 1A, an information distribution service is provided as a service that can be accessed and used by customers of various networks. While in the embodiment shown in FIG. 1A the participant information distribution system 101 is not depicted as being provided within any one of the networks, in alternative embodiments the system 101 could be provided as a service in one of the networks that is accessible by customers of that network for initiating an information distribution session as a participant leader, and accessible by other participants from that network and other networks for participating in the session.

As noted above, the information distribution system 101 in the embodiment shown in FIG. 1A is provided as a service that is accessible by customers of any of network$_1$ 111, network$_2$ 121, ... network$_N$ 131. The information distribution system 101 includes a routing server or mobile switching center (MSC) 103 that can communicate with customers of the other networks. The information distribution system 101 includes a manager module or message reflecting point (MRP) manager 105 in conjunction with a communication module or messaging system (e.g., a short messaging service (SMS) center) 109, which are both connected to the MSC 103. The information distribution system 101 can also include an authorization database 107 that can be configured, for example, as a central database that contains details of each subscriber that is authorized to use the information distribution service. Thus, authorization database 107 is connected to the manager 109 to authenticate access to and use of the information distribution system 101, which also provides a messaging system 109.

FIG. 1A also depicts a first network, network$_1$ 111, that provides certain services to customers of the network$_1$ 111. The network$_1$ 111 includes a routing server or mobile switching center (MSC) 113 that allows customers of network$_1$ 111 to communicate via wired and/or wireless connections (e.g., using customer equipment devices such as mobile phone 115, mobile phone 117 ... and mobile phone 119) with other customers of network$_1$ 111 and/or with customers of other network(s), and to utilize services of network$_1$ 111 and/or the services of system 101. Similarly, the network$_2$ 121 includes a routing server or mobile switching center (MSC) server 123 that allows customers of network$_2$ 121 to communicate via wired and/or wireless connections (e.g., using customer equipment devices such as mobile phone 125 ... telephone 127) with other customers of network$_2$ 121 and/or with customers of other network(s), and to utilize services of network$_2$ 121 and/or the services of system 101. Also, the network$_N$ 131 includes a routing server or mobile switching center (MSC) 133 that allows customers of network$_N$ 131 to communicate via wired and/or wireless connections (e.g., using customer equipment devices such as mobile phone 135, mobile phone 137 . . . and mobile phone 139) with other customers of network$_N$ 131 and/or with customers of other network(s), and to utilize services of network$_N$ 131 and/or the services of system 101.

Various scenarios can arise in which individuals may want to exchange information, such as contact information, without an existing communication hierarchy. As an example, at the beginning of a sales meeting, various participants of the meeting from different companies or different departments may want to exchange contact information of either a business, or even a personal, nature. The practice of everyone exchanging business cards, or writing down email addresses or phone numbers multiple times is laborious, inefficient, and prone to errors. Alternatively, it could be proposed that everyone send a business card as an SMS to a volunteer's cell phone, which then concatenates all messages into one file, and sends the file to everyone else as a single short messaging service (SMS) message. However, the problem with this approach is that a concatenated file will likely be over SMS message size limit. An SMS message generally cannot be larger than one hundred and sixty ASCII (American Standard Code for Information Interchange) characters. A business card with name, title, company name, office and cell phone numbers, email address, etc. can easily go beyond one hundred ASCII characters. Therefore, the volunteer will have to send multiple SMS messages for each received SMS, plus the volunteer's own card to all others. The total number of SMS messages to send will be $N \cdot (N-1)$, where N is the total number of meeting participants, an instance of the well known $N^2$ problem. Even if this process is automated, the volunteer would find his phone busy sending multiple SMS messages constantly for a while. Alternatively, even if the volunteer instead sends all received cards concatenated into a single file via an email message to all of the participants, the other recipients will have to either have a phone that can receive emails, or have to receive the email from a computer and then manually transfer the numbers to the cell phone.

Thus, there exists a need for a network system that automates information sharing among various individuals.

The system 101 depicted in FIG. 1A provides such an automated information sharing system. As depicted in FIGS. 1A and 1B, an embodiment of such a system and method is provided in which an information distribution session can be initiated based on instructions from a first participant (or participant leader) at step 151 in FIG. 1B, and the information distribution session can be used to receive information from plural active participants (including the first participant) and distribute the information from each active participant to each of the other active participants. The method can include, following the initiation of the session by the first participant (e.g., by calling a designated phone number, by calling a phone number of the first participant's phone using that phone, by email or web address, etc.), the transmission of assigned access information and a passcode for the information distribution session to the first participant (e.g., via phone, via text message, etc.) in step 153. The first participant can then provide the access information (e.g., a phone number to call or text, email or web address, etc.) and passcode to a group of people (i.e., a group of potential active participants) in step 155, and then individuals within the group that decide to participate in the information distribution (i.e., active participants) post information (e.g., various forms of contact information (e.g., primary business contact information, secondary business contact information, personal contact information, etc.) such as, name, title(s), name of business(es), address(es), phone number(s), facsimile number(s), email address(es), web site(s), etc.) to the session in step 157 using the access information (e.g., via phone, via text message, via email, via web address, etc.) with the passcode. If the participant leader did not previously post information during step 151, then the participant leader can post information later in step 159. As information is posted to the session, a contact information database is generated and updated in step 161, and the posted information is then transmitted (e.g., via phone, via text message, via email or web, etc.) to the participant leader in step 163 and to the other active participants in step 165.

A more specific example of message reflector system (MRS) 100 can be implemented using a system with only a few more components added onto existing mobile phone network, that makes the information sharing process, (or an information distribution session), a much more efficient and simple experience. For example, with such an exemplary MRS service, when a group of cell phone users want to exchange short messages, someone within the group will become a leader to initiate the MRS service. The leader can call the leader's own cell phone number; however, instead of hearing a busy tone, the leader will be prompted to authenticate the authorization of the leader to access the MRS service. If the leader has never used the system, then the leader can be asked to authorize the activation and use of the dial-yourself service. Once the leader is authenticated, the leader can choose from a menu to use the MRS service. Of course, such a dial-yourself system can also be used for other services. Alternatively, without a dial-yourself service, the leader can call into a designated phone number to invoke the MRS service.

When the leader chooses to use the MRS service, the system will give the leader a new phone number, which can be referred to as a message reflecting point (MRP). The system will then either generate a passcode for the leader or let the leader create a passcode, which can be a string of numbers and/or letters, which will be assigned to the MRS session. The MRP is only valid for a predetermined period of time (e.g., one hour), which can be a set period of time or a period of time selected or entered by the leader.

The leader then announces to the other participants the MRP and the passcode, and the other participants can then send their virtual business cards as SMS messages into the MRS service using the MRP with the passcode. The virtual business card is, for example, a short text file that contains phone number, email address, and other relevant data such as department and title. If the card size is beyond the size limit of SMS, the user will be warned that the card will be truncated. After an active participant completes uploading of the text file to the MRS service, then the active participant will see the others active participants' cards being downloaded into his cell phone as SMS messages. The exchange session stops when either the leader closes the session, or the MRS session expires.

The downloaded card will be stored in the cell phone (or other wireless device) for further processing. For example, all phone number can be added to the phone book, by invoking an interactive java applet that prompts the user to decide which field to be a cell phone number to be added into the phone book. And the user can also use a text processing tool to concatenate all cards into a single file to be downloaded to a computer.

For example, one embodiment of such a system could be used to receive business contact information from participants via an SMS message, and then distribute to the participants the business contact information of the other participants via the SMS, thereby providing a convenient method of exchanging such business contact information amongst the participants.

Figure 2:
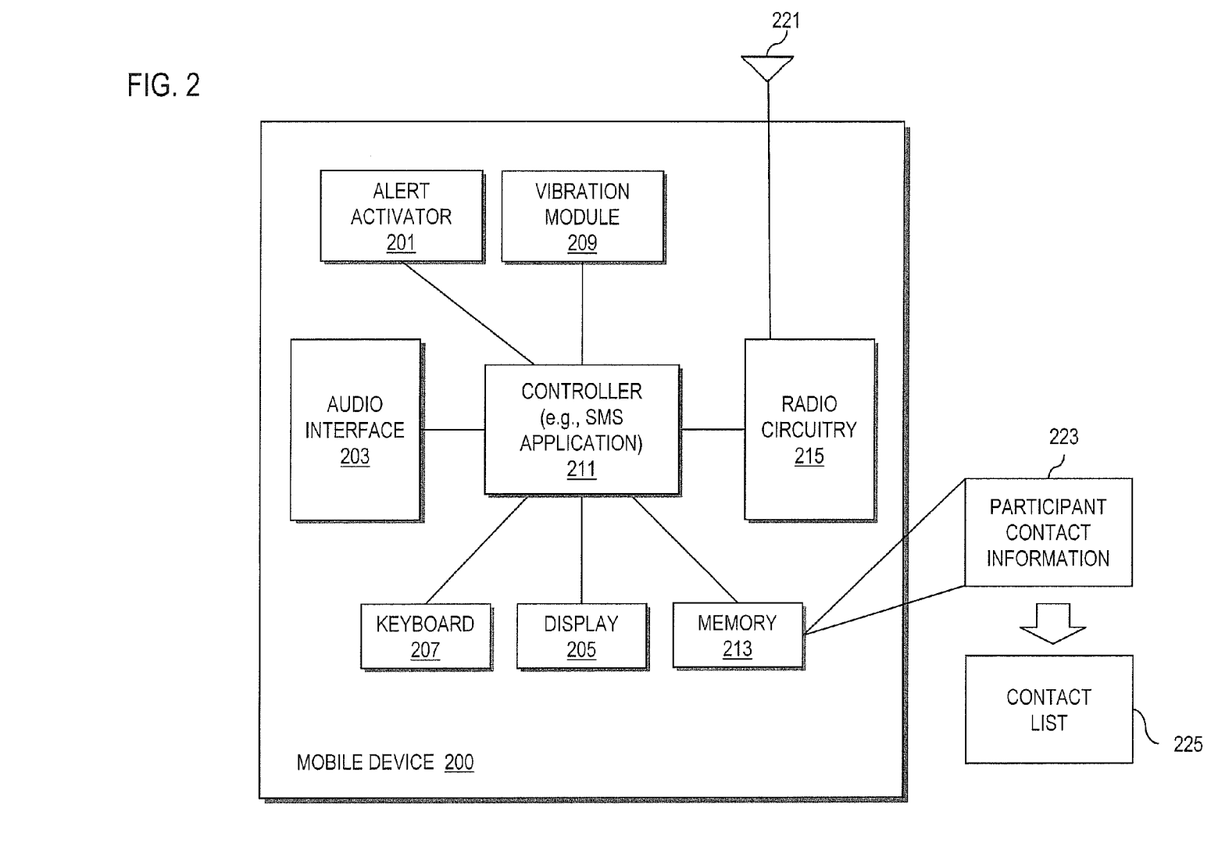
FIG. 2 is a diagram of a mobile device capable of invoking the services of the information distribution system of FIG. 1A, according to an exemplary embodiment.

FIG. 2 is a diagram of a mobile device including a distinctive alert activator, which can be used by the participant leader and/or the other participants in order to participant in the information distribution session. In the depicted embodiment, the mobile device 200 includes an alert activator 201 to effectuate the implementation of control signals received from an application server (e.g., from system 101), a call center, messaging system, and/or voice messaging system (VMS), as well as from end terminals, a host, or another mobile station. The control signals are utilized by alert activator 201 to invoke an appropriate distinctive alert setting, e.g., an alert combining aural, visual, and/or vibratory indicia. In this manner, aural indicia (e.g., ringtones) are played out by an audio interface 203, as part of an audio function circuitry (not shown) that includes a microphone and microphone amplifier that amplifies a sound signal output from the microphone. Such sound signal outputs may be fed to a coder/decoder (CODEC) for appropriate processing. Visual indicia (e.g., a light emitting diode (LED)) can be animated at a display unit 205, a keyboard 207, or other LED or lighting device of mobile device 200. Meanwhile, mechanical vibration (i.e., vibratory indicia) can be realized through a vibration module 209.

A controller 211 is provided to control the functions of audio interface 203, display unit 205, and vibration module 209, as well as keyboard 207, and a memory 213. A user can input information (e.g., user profile information, control signal requests, other alphanumeric input, and the like) via keyboard 207. It is noted that mobile device 200 may additionally (or alternatively) include other input mechanisms, such as a touch screen (not shown). Display unit 205 also provides a display to the user in support of various applications and mobile station functions. In conjunction with display unit 205, controller 211 may enable applications including a short message service (SMS) application, a multimedia messaging service (MMS) application, WAP applications, database management applications, and data exchange applications, as well as any other suitable application. Memory 213 may be utilized to store various configuration settings of mobile device 200, as well as to store received control signals for use by alert activator 201. The memory can also store participant contact information 223, which can be compiled into a contact list 225 that can be stored in the memory 213 or transferred to another device for storage in a contact information storage application (e.g., an electronic address book).

According to one embodiment, alert activator 201, in conjunction with the controller 211, designates and controls the appropriate distinctive features (e.g., aural, visual, and vibratory indicia) on mobile device 200 for a given set of circumstances, as dictated by a received control signal that may specify certain parameters governing alerts. These parameters may include sound settings (e.g., ringtone style, volume, duration, etc.), visual settings (e.g., color, intensity, lighting sequence, etc.), and vibratory settings (e.g., intensity, pulsating sequence, etc.), as well as any other suitable parameter governing the operation of mobile station 200. Hence, alert activator 201 utilizes the above parameters (stored in memory 213) to control the distinctive alert settings of mobile device 200.

In addition, the mobile device 200 employs radio circuitry 215 to communicate over radio network 103 (of FIG. 1) using radio frequency (RF) signaling. Radio circuitry 215 can be defined in terms of front-end and back-end characteristics. The front-end encompasses all of the RF circuitry, whereas the back-end encompasses all of the base-band processing circuitry. For the purposes explanation, voice/control signals transmitted to mobile device 200 can be received via antenna 221 and immediately amplified by a low noise amplifier (LNA). A down-converter can lower the carrier frequency, while a demodulator may strip away the RF leaving only a digital bit stream. The signal can go through an equalizer and may be processed by, for instance, a digital signal processor (DSP). The DSP may, depending upon the implementation, perform any of a variety of conventional digital processing functions on the received signals. For voice signals, in particular, the DSP may also determine a background noise level of a local environment from the signals detected by a microphone of audio interface 203, and set a gain of the microphone at a level to compensate for the natural tendencies of a user. A digital-to-analog converter (DAC) can convert voice signals and the resulting output may be transmitted to the user through a speaker of audio interface 203, as controlled by controller 211. Control signals may be stored to memory 213 and/or implemented via alert activator 201.

During voice transmission, a user can speak into the microphone and his/her voice, along with any detected background noise, can be converted into an analog voltage. The analog voltage may then be converted into a digital signal through an analog-to-digital converter (ADC). Controller 211 routes the digital signal into the DSP for processing therein, such as speech encoding, channel encoding, encrypting, and interleaving. The encoded signals can be routed to an equalizer for compensation of any frequency-dependent impairments that occur during transmission though the air, such as phase and amplitude distortion. After equalizing the bit stream, a modulator may combine the signal with an RF signal generated by radio circuitry 215.

The signals then can be carried by the RF by way of frequency and/or phase modulation. In order to prepare the signal for transmission, an up-converter may combine the RF wave output from the modulator with another RF wave generated by a synthesizer to achieve the desired frequency of transmission. The signal can then be sent through a power amplifier (PA) to increase the signal to an appropriate power level. In practical systems, the PA acts as a variable gain amplifier whose gain is controlled by the DSP from information received from a network base station. The signal is then filtered within a duplexer and optionally sent to an antenna coupler to match impedances to provide maximum power transfer. Finally, the signal is transmitted via antenna 221 to a local base station of a radio network. An automatic gain control (AGC) can be supplied to control the gain of the final stages of radio circuitry 215. The signals are forwarded from there to a remote end terminal which may be another mobile station, a landline end terminal connected to telephony network, or an end terminal or host connected to a data network. In other instances, mobile station 200 may be utilized to interact with an application server, a call center, a messaging system, and/or VMS.

Figure 3:
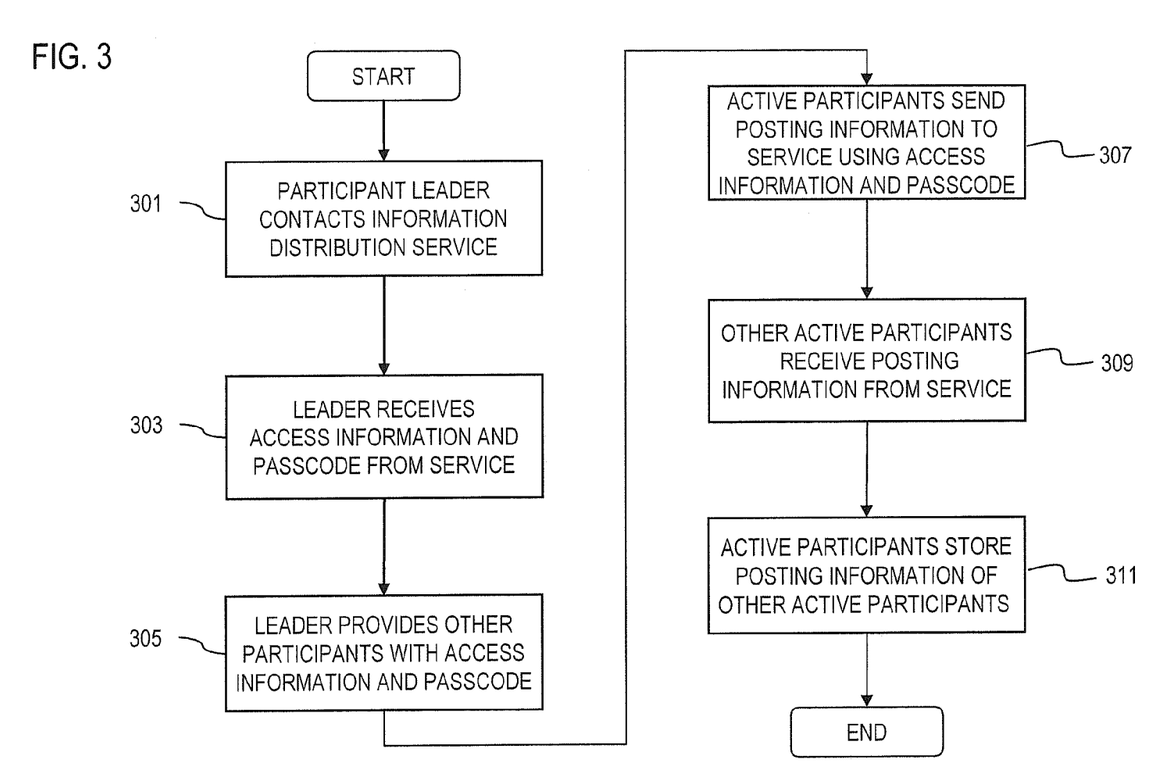
FIG. 3 is a flowchart of a process for initiating and using an information distribution service to distribute information amongst participants, according to an exemplary embodiment.

FIG. 3 is a flowchart of a process for initiating and using an information distribution service to distribute information amongst participants, which will now be described with respect to the embodiment in FIG. 1A. The manager 109 is configured to initiate an information distribution session based on instructions from a customer, for example, via mobile phone$_1$ 115, which the customer uses to access the services of the manager 109 via MSC 113 and MSC 103. Thus, for example, if a group of individuals (i.e., a group of potential participants) wants to exchange contact information, then a customer (i.e., the participant leader) using mobile phone$_1$ 115 can gain access to the information distribution service by accessing the manager 109 (e.g., by dialing the phone number of mobile phone$_1$ 115, or by dialing a designated access phone number), as noted in step 301 in FIG. 3. Thus, by accessing the information distribution service and initiating the information distribution session, the customer using mobile phone$_1$ 115 is acting as a participant "leader." The manager 109 will verify that the customer using mobile phone$_1$ 115 is authorized to use the service by contacting the database 107, and then will assign access information and a passcode to the information distribution session. Then, the messaging system 109 will transmit the access information and the passcode to the leader participant using mobile phone$_1$ 115, as noted in step 303. The leader participant can then provide the other potential participants, which can include customers of networks other than network$_1$ 101, with the access information and passcode as in step 305, so that the individuals in the potential participant group can decide to post their contact information in the session, thereby making them active participants in the session and providing their contact information to all other active participants. Thus, the messaging system 109 is configured to receive posting information sent from active participants using the access information with the passcode as in step 307, and the messaging system 109 is configured to transmit to the active participants the posting information of other active participants as in step 309 following the receipt and processing of this information by the manager 109. The active participants can then store the posting information of the other active participants for later use, as in step 311.

FIG. 3 will now be described with respect to the embodiment in FIG. 1A. The manager 109 is configured to initiate an information distribution session based on instructions from a customer, for example, via mobile phone$_1$ 115, which the customer uses to access the services of the manager 109 via MSC 113 in communication with MSC 103. Thus, the leader participant uses the respective mobile phone$_1$ 115 to gain access to the information distribution system 101 by accessing the manager 109 (e.g., by dialing a designated access phone number, etc.), as in step 301 of FIG. 3. The manager 109 will verify that the customer using mobile phone$_1$ 115 is authorized to use the service by contacting the database 107, and then will assign access information and a passcode to the information distribution session. Then, the messaging system 109 will transmit the access information and the passcode to the leader participant using mobile phone$_1$ 115 via MSC 103 and MSC 113, as in step 303. The leader participant can then provide the other potential participants, which can include customers of any of the various networks that can communicate with MSC 103, with the access information and passcode as in step 305 (e.g., electronically or verbally, etc., or by designating the system 101 to send such information directly to the other participants), so that the individuals in the potential participant group can decide to post their contact information in the session. Thus, the messaging system 109 is configured to receive posting information sent from active participants using the access information with the passcode as in step 307, and the messaging system 109 is configured to transmit to the active participants the posting information of other active participants as in step 309 following the receipt and processing of this information by the manager 109. The active participants can then store the posting information of the other active participants for later use, as in step 311.

Figure 4:
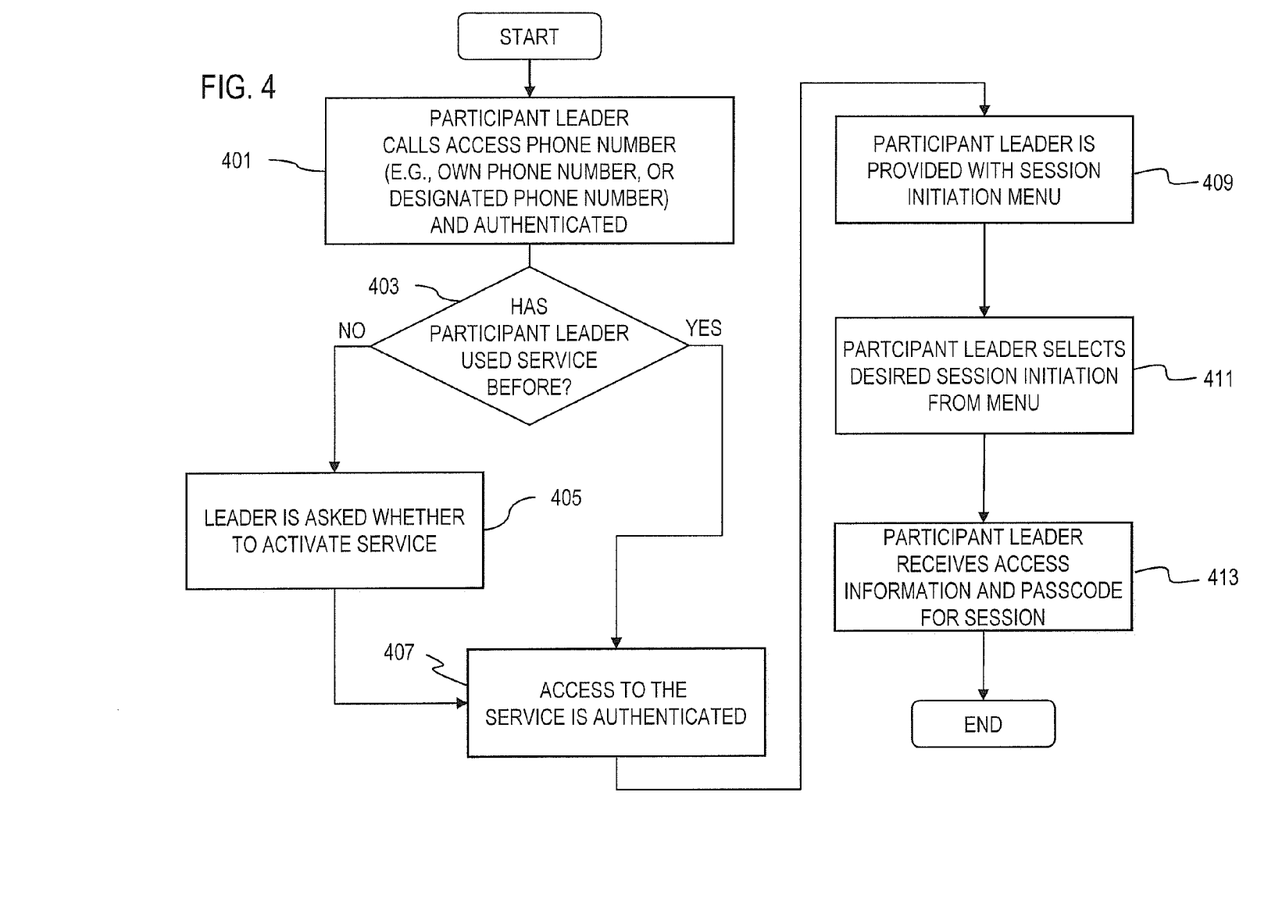
FIG. 4 is a flowchart of a process for initiating an information distribution session by a participant leader using an information distribution service, according to an exemplary embodiment.

FIG. 4 is a flowchart of a process for initiating an information distribution session by a participant leader using an information distribution service, according to an exemplary embodiment. In step 401, the participant leader calls an access phone number for the information distribution service, which can be, for example, the phone number of the phone used to make the call, or a designated phone number for the service, where the leader is identified and authenticated. In step 403, it is determined whether or not the participant leader has used the information distribution service before. If the participant leader has not used the service before, then the service can ask the participant leader whether to activate the service for the participant leader in step 405, for example, by prompting the participant leader to make a selection that would activate an account for the participant leader including setting up billing information, passwords, personal identification numbers (PINs), etc. Alternatively, if the participant leader has used the service before, then in step 407 the service would verify the participant leader's authorization to access the service, for example, by prompting for a password or PIN, and/or verifying authenticity of the phone used to call the service.

One embodiment of steps 401, 403, 405, and 407 can be implemented as follows. The participant leader can access the service by dialing a phone number of the participant leader's own cell phone, and a control signal of such a call is processed through the phone system's control signal system, such as SS7 (Signal System 7) or SIP (Session Initiation Protocol), which then checks a user database HLR (Home Location Register) to find that the calling number is the same as the called number. Normally, when such a call is placed, the signal control system would return to the caller a busy signal to refuse the connection; however, in the case of a dial-yourself service of this embodiment, the signal is intercepted to be directed to the manager module (or MRS server), instead of sending a busy signal back to the caller. The interactive session of the call-yourself service can be implemented, for example, with service of USSD (Unstructured Supplementary Service Data) or any service through which an interactive session between the phone and a USSD server can be conducted, such as a process running in the MRS server that answers the phone call, prompts the caller to authenticate, and provides a menu for the caller to choose a service desired, as noted below in step 409.

Once access has been granted to the participant leader, in step 409 the participant leader can be provided with a session initiation menu. It is noted that the menu can also include selections that relate to other services, if the service provider provides for such a menu and other services. The session initiation menu can allow the participant leader to select the desired characteristics of the information distribution session, for example, the menu can allow the leader to set the passcode used for the session, to set the period of time during which the session will remain active before expiring, etc. Thus, in step 411, the participant leader selects the desired session initiation characteristics from the menu in order to initiate the session. Then, in step 413, the participant leader will receive from the information distribution service the access information for the session and the passcode.

Figure 5:
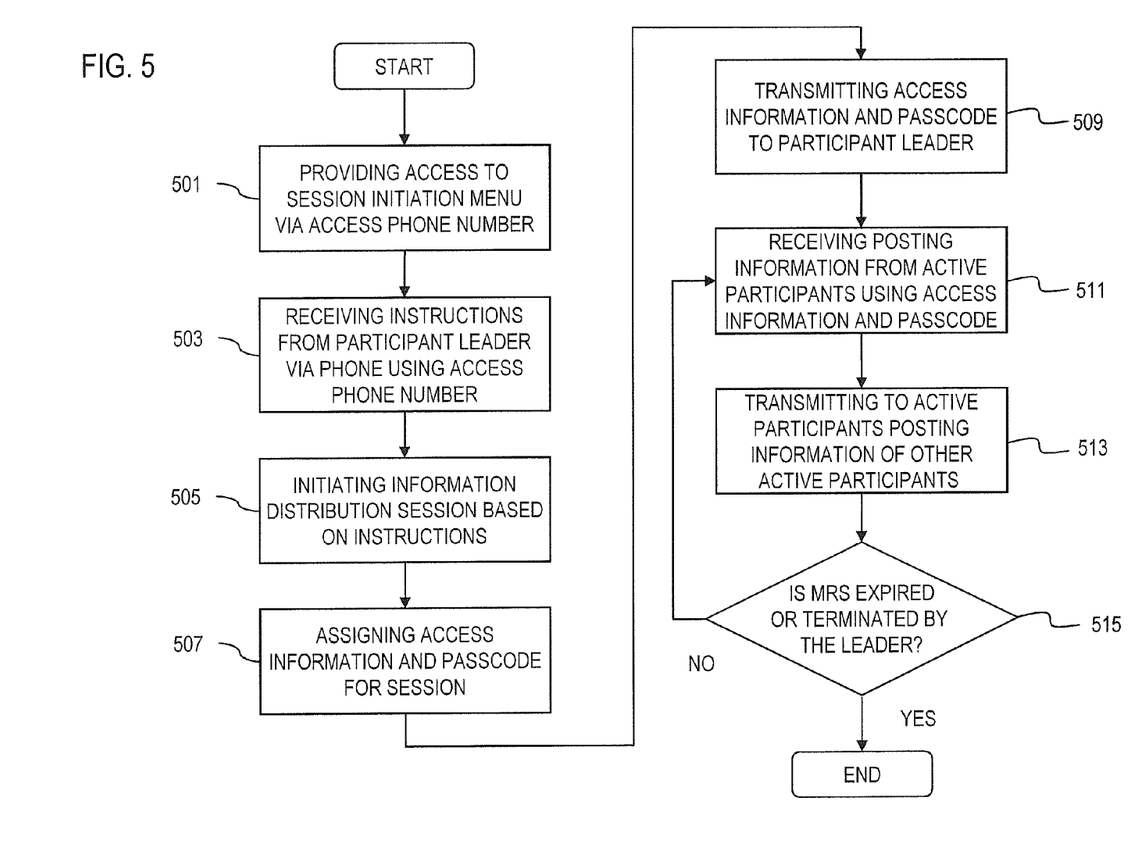
FIG. 5 is a flowchart of a process for providing an information distribution service by a service provider, according to an exemplary embodiment.
Figure 6:
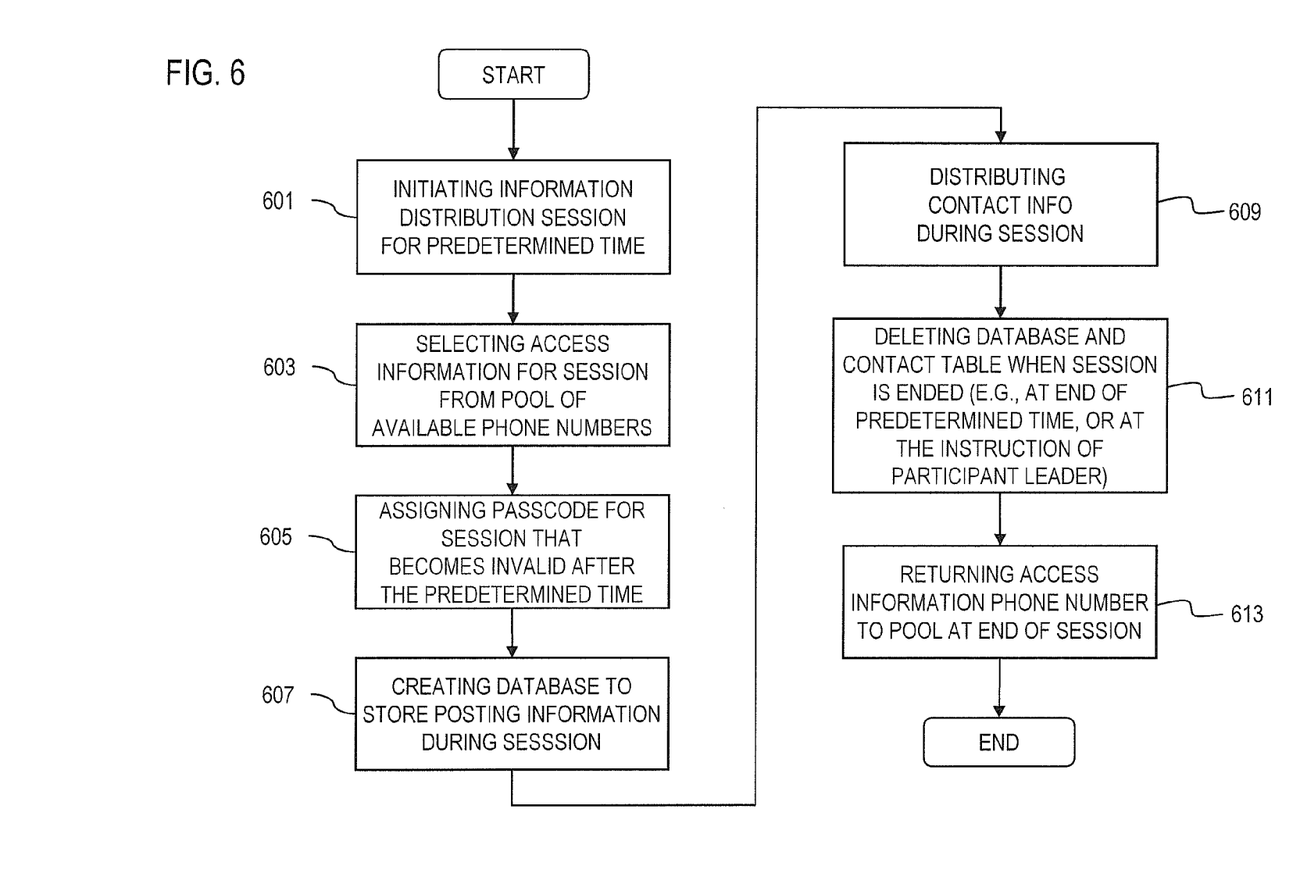
FIG. 6 is a flowchart of a process for initiating and running an information distribution session by a service provider, according to an exemplary embodiment.
Figure 7:
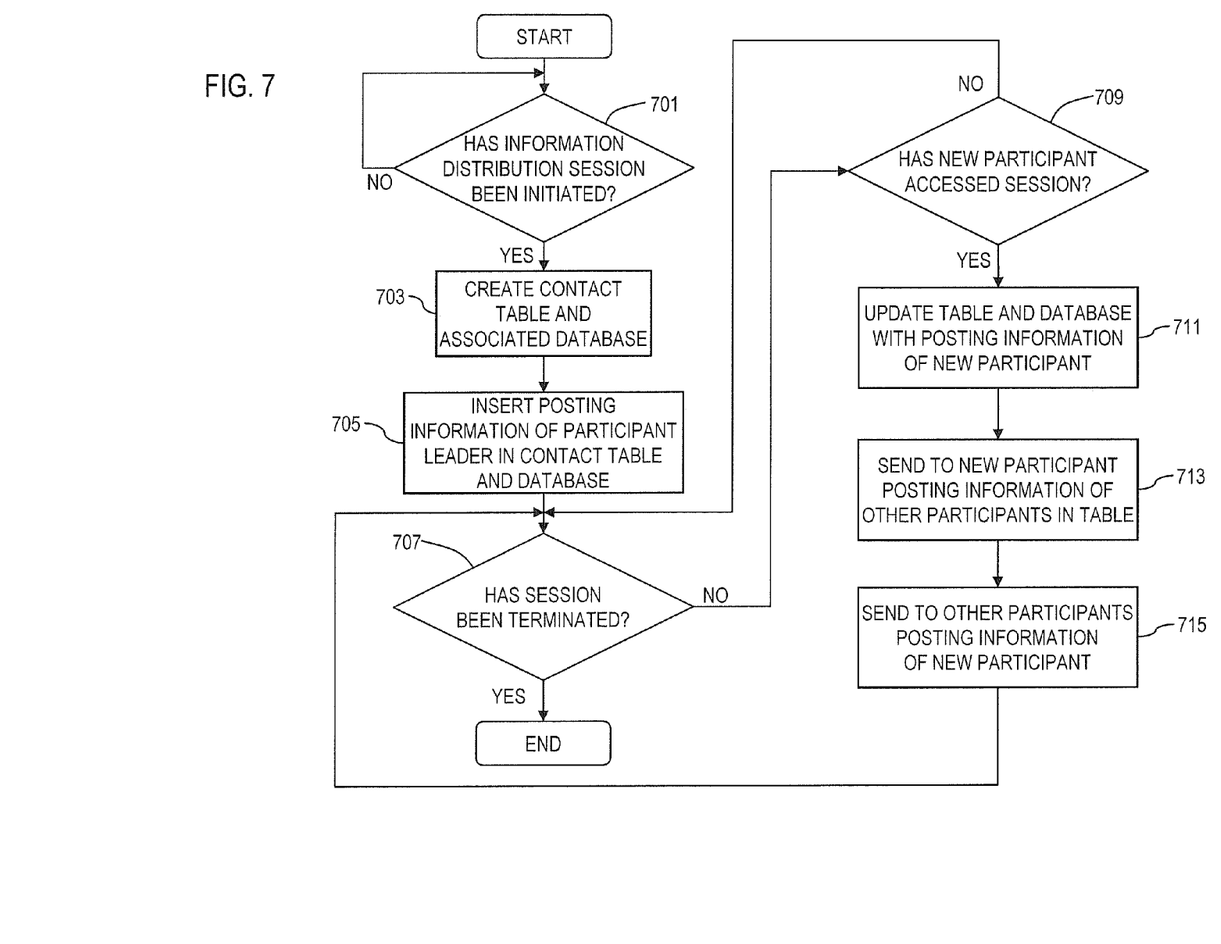
FIG. 7 is a flowchart of a process for receiving and distributing posting information during an information distribution session, according to an exemplary embodiment.

FIG. 5 is a flowchart of a process for providing an information distribution service by a service provider, according to an exemplary embodiment. In order provide the information distribution service, the service provider (e.g., manager 109, and messaging system 109) performs the general steps set forth in FIG. 5. FIGS. 6 and 7, which will be discussed later, provide further details regarding the steps performed by the service provider.

In step 501, the service provider provides access to a session initiation menu via an access phone number (e.g., using manager 109), in order for the participant leader to access and use the service. In step 503, the service provider can receive instructions from the participant leader using the menu via a phone using the access phone number. The service provider in step 505 can initiate an information distribution session (e.g., using manager 109) based on the instructions received from the participant leader. The service provider then assigns access information and a passcode (e.g., using manager 109), which can be generated by the manager module or set by the participant leader, for the session in step 507. The service provider then transmits (e.g., using messaging system 109, or via the phone connection used to initiate the session) the access information and passcode to the participant leader in step 509. For example, with respect to steps 507 and 509, a set of phone numbers can been assigned to the manager module (MRS server) as a pool of available phone numbers (MRS pool) for use by the manager module for sessions. When the leader initiates an information distribution session, a new session is created, for example, under the name of the caller (i.e., participant leader), and an unused access phone number is assigned to the session. The assigned access phone number is then sent to the caller with the passcode.

The service provider then receives (e.g. using messaging system 109, and using manager 105) posting information from active participants using the access information and the passcode in step 511. The service provider then transmits (e.g. using messaging system 109) to all the other active participants the posting information of new active participant in step 513. Thus, for example, after the participant leader distributes the assigned access phone number, then participants can start sending their contact information, such as business cards, using a short messaging service protocol as SMS messages to the manager module. For example, the business card can already have been created and stored in the phone as a small text file, and thus the participant need only use a small applet to retrieve the text file and send to the text file to the manager module as an SMS message. Such an applet can be provided for download from a service website from the carrier or the information distribution service provider, for example, through a menu in the dial-yourself service.

After the card is transmitted, the MSP manager 105 checks, in step 515, whether the MRS service has expired or been terminated by the leader. If not, the process waits for more SMS messages to be distributed to all other participants. Otherwise the process stops.

FIG. 6 is a flowchart of a process for initiating and running an information distribution session by a service provider, according to an exemplary embodiment. Upon receipt of instructions from the participant leader to initiate the information distribution session, the manager module will initiate the information distribution session for the predetermined period of time, in step 601. In step 603, the manager module will select the access information for the session, for example, by selecting an access phone number from a pool of available phone numbers provided by the service provider for use for such purposes. In step 605, the manager module then assigns the passcode to the session, which will be set to expire or become invalid after expiration of the predetermined period of time set for the session. Thus, even if a participant attempts to access and utilize the information distribution service after the session expires using a access phone number that has since been reassigned to another session, the participant will not be able to gain access since the passcode will no longer be valid or match that access phone number.

In step 607, a database is created in order to store posting information from the active participants during the session. Additionally, in step 609, a contact table is distributed during the session. Thus, when participants post information to the information distribution session, for example, using an SMS message, then the SMS message will be routed through a normal SMS service path, and eventually reaches the SMS Center (SMSC), which forwards the SMS message to the MRS number (i.e., access phone number for the session). Since the MRS number is selected from a reserved pool of available numbers (or an MRS pool), the SMS message will be forwarded to the MRS server (or manager module). Upon receiving the SMS message, the MRS server stores it in the corresponding mailbox (or database) created for the session associated with the MRS number, adds the phone numbers of the callers (or active participants) to a contact table created for the session, and sends the SMS message to all others in the contact table. The SMS messages will be routed through the SMSC to all participants including the participant leader. This process reiterates every time a new caller number is added into the contact table, as described below with respect to FIG. 7 and in the pseudo-code presented below, until the session is closed by the leader or the MRS expires.

When the information distribution session has ended for any reason (e.g., at the end of the predetermined time for the session (i.e., expiration of the session and passcode), or at the instruction of the participant leader), then in step 611 in FIG. 6 the database and contact table are deleted or tagged for deletion in order to make room for further session(s). Also, at the end of the session, the access information assigned to the session, such as the access phone number, is returned to the pool of available access information in step 613, so that it can be reused in another session. Thus, when the session ends, the mailbox and the contact table for the session are deleted and the MRS number is returned to the pool of numbers. The participant leader can delete the session, for example, by sending an SMS to the access number with the passcode, or by using the dial-yourself service to choose close the session from the menu. The instruction will be authenticated by comparing the caller phone number with the leader number stored in the contact table. If the numbers match, the instructions are executed, which deletes the mailbox and closes the session. Once the session is closed, depending on the implementation, the process or thread will be stopped.

FIG. 7 is a flowchart of a process for receiving and distributing posting information during an information distribution session, according to an exemplary embodiment. The process begins with a query in step 701 to determine whether an information distribution session has been initiated. The manager module can execute such a query at regular intervals, and if the answer to the query is negative then the query will be repeated at the next interval, and if the answer to the query is positive that an information distribution session has been initiated then the process will proceed to step 703. In step 703, a contact table and associated database are created for the session, as noted in step 607 of FIG. 6. In step 705, the posting information of the participant leader is inserted into the contact table (e.g., the contact phone number of the participant leader) and the associated database (e.g., all contact information posted by the participant leader).

Then, in step 707, a query is posed to determine whether the information distribution session has been terminated, for example, by the participant leader or due to expiration of the session. If the query in step 707 is answered in the positive then the process ends, and if the query in step 707 is answered in the negative then the process proceeds to step 709. In step 709, a query is posed to determine whether a new participant has accessed the session. If the query in step 709 is answered in the negative then the process loops back to the query in step 707, and if the query in step 709 is answered in the positive then the process proceeds to step 711. In step 711, the contact table and associated database are updated with the posting information of the new active participant. Then, in step 713, the information distribution service sends to the new participant all of the posting information of the other participant(s) in the database using the contact phone number of the new participant in the contact table. In step 715, the information distribution service sends to the other active participant(s) the posting information of the new active participant in the database using the contact phone number(s) of the other active participant(s) in the contact table. Then, the process loops back to the query in step 707, such that the session can be terminated when appropriate and new participants processed when appropriate.

Figure 8:
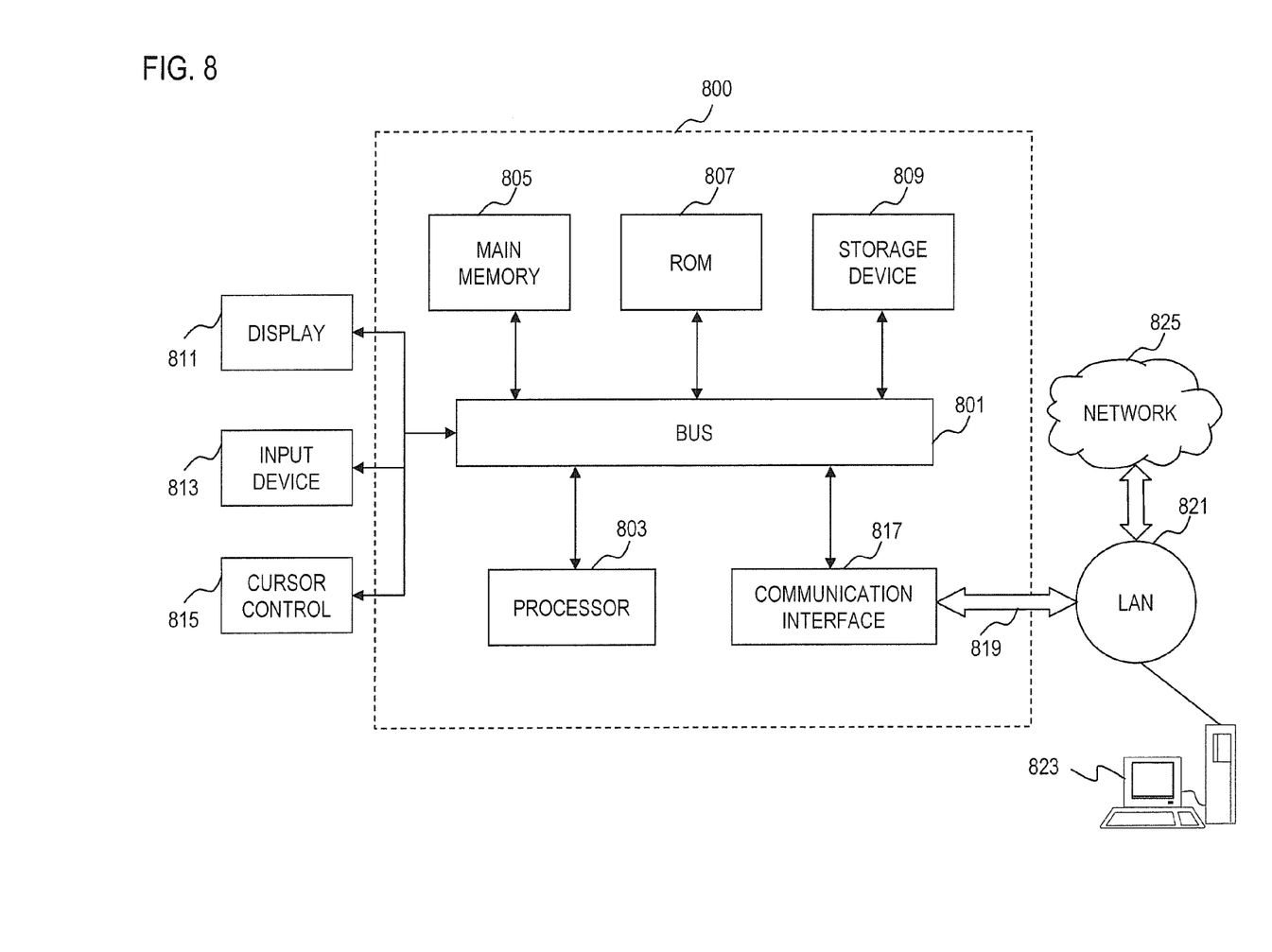
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 900, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, hard disk, magnetic tape, any other magnetic medium, a CD-ROM, CDRW, DVD, any other optical medium, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

The invention claimed is:

1. A method comprising:
    initiating an information distribution session at a communications switching center based on instructions received via a network from a first participant of a plurality of network participants;
    assigning access information to the communications switching center and a passcode for the information distribution session, wherein the access information is a phone number selected from a pool of available phone numbers stored in a non-transitory computer readable medium;
    receiving posting information at the communications switching center sent via the network from two or more active participants of the plurality of participants using the access information and the passcode; and
    transmitting from the communications switching center to the active participants via the network the posting information of other active participants during the session;
    wherein the passcode becomes invalid after a predetermined period of time following initiation of the information distribution session, and wherein, after the passcode becomes invalid, the selected phone number is returned to the pool of available phone numbers.

2. The method according to claim 1, wherein the posting information is received and transmitted via either a short messaging service protocol or an instant communications protocol.

3. The method according to claim 2, wherein the posting information includes contact information for the active participant, and wherein the contact information is received and transmitted as a text file.

4. The method according to claim 1, further comprising ending the information distribution session either upon receipt of a termination instruction from the first participant or after a predetermined period of time following initiation of the information distribution session.

5. The method according to claim 1, further comprising transmitting from the communications switching center an access number via the network to the first participant to provide access to a session initiation menu, wherein the session initiation menu includes one or more selections for inputting the instructions.

6. The method according to claim 5, wherein the access number is a phone number of the phone of the first participant.

7. A method comprising:
    selecting an access phone number from a pool of available phone numbers stored in a non-transitory computer readable medium;
    assigning the access phone number and a passcode for an information distribution session at a communications switching center;
    receiving via a network posting information sent via a short messaging service protocol to the access phone number with the passcode from a plurality of active network participants;
    transmitting through the network via the short messaging service protocol to the plurality of active participants the posting information of other active participants during the information distribution session with the communications switching center; and
    invalidating the passcode after a predetermined period of time following initiation of the information distribution session, and
    returning the selected phone number to the pool of available phone numbers.

8. The method according to claim 7, wherein the information distribution session is initiated based on instructions received via the network from a first participant.

9. The method according to claim 8, further comprising ending the information distribution session either upon receipt of a termination instruction from a first participant or after a predetermined period of time following an initiation of the information distribution session.

10. The method according to claim 7, wherein the posting information includes business contact information for the active participant, and wherein the business contact information is received and transmitted as a text file.

11. The method according to claim 7, further comprising:
    transmitting an access number from the communications switching center via the network to a first network participant to provide access to a session initiation menu via an access phone number, wherein the session initiation menu includes one or more selections for inputting instructions to initiate the information distribution session, and
    receiving at the communications switching center via the network the instructions from the first network participant via a phone, wherein the access phone number is a phone number of the phone.

12. A system comprising:
    a communications switching center including a manager module configured to initiate an information distribution session at the communications switching center based on instructions from a first network participant of a plurality of network participants, and to assign access information and a passcode to the information distribution session; and
    a communication module included in the communications switching center configured to receive posting information sent via a network from two or more active network participants of the plurality of participants using the access information with the passcode, and wherein the communication module is configured to transmit via the network to the active participants the posting information of other active participants;

wherein the manager module is configured to select the access information from a pool of available phone numbers stored in a non-transitory computer readable medium, wherein the passcode becomes invalid after a predetermined period of time following initiation of the information distribution session, and wherein the manager module is configured to return the selected phone number to the pool of available phone numbers in the non-transitory computer readable medium after the passcode becomes invalid.

13. The system according to claim 12, wherein the communication module is configured to receive and transmit the posting information via a short messaging service protocol.

14. The system according to claim 12, wherein the manager module is configured to end the information distribution session either upon receipt of a termination instruction from the first participant or after a predetermined period of time following an initiation of the information distribution session.

15. The system according to claim 12, wherein:
the manager module is configured to provide access to a session initiation menu via an access phone number, wherein the session initiation menu includes one or more selections for inputting instructions to initiate the information distribution session; and
the manager module is configured to receive the instructions from the first participant via a phone, wherein the access phone number is a phone number of the phone.

16. A method comprising:
initiating an information distribution session at a communications switching center based on instructions received via a network from a first participant of a plurality of network participants;
creating a database and a contact table in a non-transitory computer readable medium for the information distribution session;
assigning access information to the communications switching center and a passcode for the information distribution session;
receiving posting information at the communications switching center sent via the network from two or more active participants of the plurality of participants using the access information and the passcode;
storing the posting information in the database;
transmitting from the communications switching center to the active participants via the network the posting information of other active participants during the session,
wherein contact phone numbers present in the posting information of the active participants are added to the contact table and used to transmit the posting information to the active participants; and
ending the information distribution session after a predetermined period of time and deleting the database and contact table from the non-transitory computer readable medium.

* * * * *